United States Patent
Lyssy et al.

(10) Patent No.: US 11,029,433 B2
(45) Date of Patent: Jun. 8, 2021

(54) CALIBRATION OF STREAMER NAVIGATION EQUIPMENT

(71) Applicant: PGS Geophysical AS, Oslo (NO)

(72) Inventors: Matthew Eric Lyssy, Houston, TX (US); Mattias Südow, Kista (SE); Toralf Lund, Oslo (NO); Andre Stenzel, Houston, TX (US)

(73) Assignee: PGS Geophysical AS, Oslo (NO)

( * ) Notice: Subject to any disclaimer, the term of this patent is extended or adjusted under 35 U.S.C. 154(b) by 444 days.

(21) Appl. No.: 15/835,792

(22) Filed: Dec. 8, 2017

(65) Prior Publication Data

US 2018/0172863 A1 Jun. 21, 2018

Related U.S. Application Data

(60) Provisional application No. 62/435,177, filed on Dec. 16, 2016.

(51) Int. Cl.
- *G01V 1/38* (2006.01)
- *G01C 17/38* (2006.01)
- *G01S 7/52* (2006.01)

(52) U.S. Cl.
CPC .......... *G01V 1/3835* (2013.01); *G01C 17/38* (2013.01); *G01S 7/52004* (2013.01); *G01V 1/38* (2013.01)

(58) Field of Classification Search
CPC .... G01V 1/3835; G01V 1/38; G01S 7/52004; G01C 17/38
USPC .......................................................... 367/13
See application file for complete search history.

(56) References Cited

U.S. PATENT DOCUMENTS

| | | | |
|---|---|---|---|
| 4,031,630 A | 6/1977 | Fowler | |
| 4,068,208 A | 1/1978 | Rice et al. | |
| 4,471,534 A * | 9/1984 | Fowler | G01C 17/36 33/363 N |
| 4,481,611 A * | 11/1984 | Burrage | G01V 1/3835 367/19 |
| 4,912,682 A | 3/1990 | Norton et al. | |
| 5,287,628 A | 2/1994 | Yamaguchi et al. | |
| 8,136,383 B2 | 3/2012 | Goujon et al. | |
| 8,278,929 B2 | 10/2012 | Summerfield et al. | |
| 8,358,560 B2 | 1/2013 | Muyzert et al. | |
| 9,389,328 B2 | 7/2016 | Schneider et al. | |
| 2011/0007602 A1 | 1/2011 | Welker et al. | |

(Continued)

FOREIGN PATENT DOCUMENTS

| | | |
|---|---|---|
| EP | 0110230 | 6/1984 |
| EP | 0308222 | 3/1989 |

OTHER PUBLICATIONS

International Preliminary Report on Patentability for related European PCT Application PCT/EP2017/083089, dated Jun. 27, 2019 (12 pgs).

(Continued)

*Primary Examiner* — Ian J Lobo

(57) ABSTRACT

An apparatus can include a base assembly and a pivot assembly coupled to the base assembly. The apparatus can include a carriage coupled to the pivot assembly. The carriage can be shaped to receive a compass streamer telemetry unit (CSTU). The carriage can be configured to secure the CSTU. The pivot assembly can be rotatably coupled to the base assembly to adjust a pitch of the carriage. The carriage can be rotatably coupled to the pivot assembly to adjust roll of the carriage.

9 Claims, 6 Drawing Sheets

(56) References Cited

U.S. PATENT DOCUMENTS

2015/0016216 A1   1/2015  Sudow
2015/0117148 A1   4/2015  Drange et al.
2016/0282494 A1   9/2016  Leboeuf

OTHER PUBLICATIONS

International Search Report and Written Opinion for related European PCT Application PCT/EP2017/083089, dated Apr. 25, 2018 (21 pgs).
Stmicroelectronics: "Using LSM303DLH for a Tilt Compensated Electronic Compass"; Aug. 2010 (34 pgs).
ION Marine Imaging Systems; Model 5011 Compass Bird: Performance Data (2 pgs), 2007. http://www.iongeo.com/content/documents/Resource%20Center/Brochures%20and%20Data%20Sheets/Data%20Sheets/Marine%20Systems/Positioning/Other/MIS_CompassBird_DS_071126_rev1.pdf.

* cited by examiner

CALIBRATION OF STREAMER NAVIGATION EQUIPMENT

CROSS-REFERENCE TO RELATED APPLICATIONS

This application claims priority to U.S. Provisional Application 62/435,177, filed Dec. 16, 2016, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the water surface and over a subterranean formation to be surveyed for mineral deposits. Receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the water surface. The receivers thereby measure a wavefield that was initiated by the actuation of the source.

DETAILED DESCRIPTION

Figure 1:
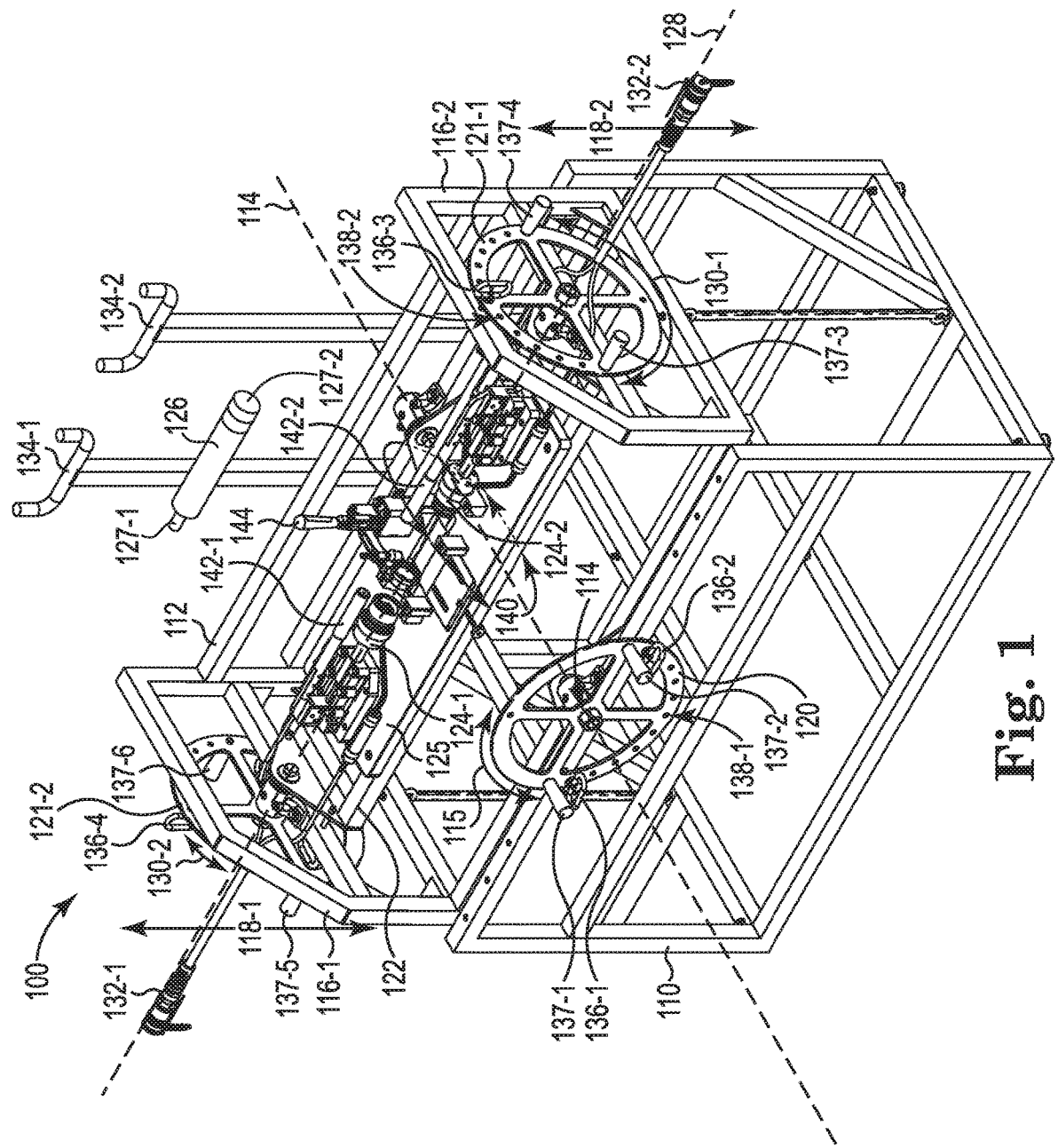
FIG. 1 illustrates a perspective view of an apparatus for calibration of streamer navigation equipment.

This disclosure is related generally to the field of marine surveying. Marine surveying can include, for example, seismic surveying or electromagnetic surveying, among others. For example, this disclosure may be related to marine surveying, in which one or more sources are used to generate wave-fields, and receivers (towed and/or ocean bottom) receive energy generated by the sources and affected by the interaction with a subsurface formation. The receivers thereby collect survey data, which can be useful in the discovery and/or extraction of hydrocarbons from subsurface formations.

A towed object, such as a source, a receiver, or a streamer, may be towed behind a marine survey vessel to collect the survey data. A streamer can be a marine cable assembly that can include receivers and electrical or optical connections to transmit information collected by the receivers to the marine survey vessel. The streamer can include receivers such as seismic receivers (e.g., hydrophones, geophones, etc.) or electromagnetic receivers. The streamer can include a streamer telemetry unit (STU) with a compass. The compass along with the STU may be referred to herein as CSTU. The compass can be used to determine a heading or additional spatial and navigational information for the streamer. A multi-dimensional calibration can be performed to render high quality heading values. In some previous approaches, in-sea calibration can be performed after streamer deployment in a body of water. However, it can be beneficial to calibrate the compass prior to deployment and have the compass generate these high quality heading values upon first deployment (and be operational without performing calibration after deployment). However, embodiments of the present disclosure do not preclude further calibration after deployment.

A two-dimensional roll of the CSTU may not be sufficient to generate a heading dataset to perform a calibration. As described further below, an apparatus that allows for rotation about at least two axes can be used to calibrate the compass within the CSTU. For example, rotation about an axis that adjusts a roll of the CSTU can be performed. Rotation about an axis that adjusts a pitch of the CSTU can be performed. In this way, the CSTU can be placed in different orientations that facilitate calibration readings that correspond to the different orientations. The calibration telemetry data recorded can be compared to an expected telemetry field shape. The differences between the recorded data and the expected data can be used to determine calibration values and/or heading values to correct for deviations in the compass of the STU being tested. A calibration value can include calibration data acquired from the CSTU for analysis in calibrating the CSTU during in-field use. A heading value can indicate a heading of the CSTU based on a position and/or location of the CSTU.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Multiple analogous elements within one figure may be referenced with a reference numeral followed by a hyphen and another numeral or a letter. For example, 121-1 may reference element 21-1 in FIGS. 1 and 121-2 may reference element 21-2, which can be analogous to element 21-1. Such analogous elements may be generally referenced without the hyphen and extra numeral or letter. For example, elements 121-1 and 121-2 may be generally referenced as 121. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates a perspective view of an apparatus 100 for calibration of streamer navigation equipment. The apparatus 100 can include a base assembly 110 and a pivot assembly 112. The base assembly 110 can be a rectangle-shaped base for the apparatus 100. The pivot assembly 112 can be generally rectangle-shaped and used to hold a compass for the streamer navigation equipment. The apparatus 100 can include a carriage 122 that is used to adjust a roll when calibrating the streamer navigation equipment. The apparatus 100 can include a fixture 125 for holding a compass streamer telemetry unit (CSTU) 126. The apparatus 100 can include a compass streamer telemetry unit (CSTU) 126 used to collect and transmit telemetry data from the CSTU 126 to an associated marine vessel and/or receive telemetry data from the marine vessel. The CSTU 126 can include a streamer telemetry unit (STU) and a compass combined into one unit. The CSTU 126 is illustrated as above the pivot assembly 112 for ease of description and illustration. A first end 127-1 of the CSTU 126 can be inserted into a first coupler 124-1 and a second end 127-2 can be inserted into a second coupler 124-2. The first end 127-1 can be a male end and can be inserted into the first coupler 124-1 which has a female end. The first end 127-1 can include electrical connections and other equipment for transferring and/or receiving navigational data. The first coupler 124-1 can include electrical connections to receive and/or transfer navigational data to and from the CSTU 126. The second coupler 124-2 can be a female end and the second end 127-2 can be inserted into the second coupler 124-2. A pitch wheel 120 can be used to adjust a pitch and a first roll wheel 121-1 and a second roll wheel 121-2 can be used to adjust a roll associated with the apparatus 100.

The pivot assembly 112 can be rotatably coupled to the base assembly 110. Rotatably coupled can refer to a first component being coupled to a second component where the first component has limited movement in some directions but can be rotated about the point of coupling. For example, the pivot assembly 112 can rotate about a lateral axis 114 while remaining coupled to the base assembly 110. The pivot assembly 122 is limited in movement along the lateral axis 114 in relation to being coupled to the base assembly 110. While rotating about the lateral axis 114, a first end 116-1 of the pivot assembly 112 can be raised (indicated by the up arrow of double-sided arrow 118-1) while a second end 116-2 is lowered (indicated by the down arrow of the double-sided arrow 118-2). Alternatively, the first end 116-1 of the pivot assembly 112 can be lowered (indicated by the down arrow of double-sided arrow 118-1) while the second end 116-2 is raised (indicated by the up arrow of double-sided arrow 118-2). The pivot assembly 112 can be rotated by rotating, indicated at arrow 115, a pitch wheel 120 where the pitch wheel 120 is fixedly coupled to the pivot assembly 112 and the base assembly 110 remains stationary during the rotation. As the pitch wheel 120 rotates, the pivot assembly 112 rotates an equal amount, in degrees, about the lateral axis 114. The lateral axis 114 can be perpendicular to the pitch wheel 120, as illustrated, and the lateral axis 114 can run through a center of the pitch wheel 120.

A pitch of the fixture 125 can be adjusted by rotating the pitch wheel 120 and causing the carriage 122 and thereby the fixture 125 to rotate about the lateral axis 114. By rotating the pitch wheel 120 clockwise in relation to arrow 115, the first end 116-1 of the pivot assembly 112 is raised, as indicated by up arrow of 118-1, and the pitch of the carriage 122, and thereby the pitch of the fixture 125 and the CSTU 126, is increased. Alternatively, as the pitch wheel 120 is turned counter-clockwise in relation to arrow 115, the first end 116-1 of the pivot assembly 112 is lowered, as indicated by down arrow of 118-1, and the pitch of the carriage 112, and thereby the pitch of the fixture 125 and the CSTU 126, is decreased. In at least one embodiment, the pivot assembly 112 is prevented from making a full rotation about the lateral axis 114 and may be limited by the setup of the apparatus 100. For example, the pivot assembly 112 may be able to rotate up to a particular amount, such as 60 degrees, 90 degrees, etc., from its illustrated position (where the fixture 125 is illustrated as having a 0 degree pitch). While the CSTU 126 is not illustrated as on the fixture 125, it should be understood that as a pitch and/or roll of the fixture 125 is adjusted, the pitch and/or roll of the CSTU 126 is also adjusted in kind. For example, as the fixture 125 is rotated a particular amount (to adjust the roll), the CSTU 126 is rotated the particular amount. Likewise, as a pitch of the fixture 125 is adjusted a particular angle, the pitch of the CSTU 126 is adjusted the particular angle.

A carriage 122 can be rotatably coupled to the pivot assembly 112. The carriage 122 can rotate about a longitudinal axis 128. As a first roll wheel 121-1 on the second end 116-2 is rotated, indicated by arrow 130-1, the carriage 122 and the first roll wheel 121-1 can rotate, as indicated by arrow 140, an equal amount, in degrees, about the longitudinal axis 128 because the first roll wheel 121-1 is fixedly coupled to the carriage 122. The longitudinal axis 128 can be perpendicular to the first roll wheel 121-1, as illustrated. The longitudinal axis can run through a center of the first roll wheel 121-1. The carriage 122 is illustrated as rotating counter-clockwise by arrow 140 with respect to the first roll wheel 121-1, but the carriage can also rotate clockwise with respect to the first roll wheel 121-1. A second roll wheel 121-2 of the first end 116-1 rotates, as indicated by arrow 130-2, along with the carriage 122 and the first roll wheel 121-1 because both the first roll wheel 121-1 and the second roll wheel 121-2 are fixedly coupled to the carriage 122. Embodiments are not limited to the carriage 122 being coupled to two roll wheels. In at least one embodiment, the carriage 122 can be coupled to only one roll wheel on either end of the carriage 122.

A fixture 125 can be fixedly coupled to the carriage 122. The carriage 122 can be shaped to receive fixture 125. The fixture 125 can be positioned into the carriage 122 as the carriage 122 is shaped for insertion of the fixture 125. The carriage 122 can be configured to secure the fixture 125 in place. The fixture 125 can be secured to the carriage 122 by fastening mechanisms (such as a bolt, a screw, a pin, etc.).

A roll of the fixture 125 can be adjusted by rotating the first roll wheel 121-1 and causing the carriage 122 and thereby the fixture 125 to rotate about the longitudinal axis 128. By rotating the first roll wheel 121-1 clockwise, in relation to arrow 130-1, a roll of the carriage 122 is adjusted as the carriage 122 is likewise rotated clockwise about the longitudinal axis 128. Alternatively, by rotating the first roll wheel 121-1 counter-clockwise, in relation to arrow 130-1, the roll of the carriage 122 is adjusted as the carriage 122 is likewise rotated counter-clockwise about the longitudinal axis 128. In at least one embodiment, the carriage is fully rotatable 360 degrees and can be rotated more than one full 360 degree rotation.

The fixture 125 is coupled to a first cabling 132-1 that extends from the fixture 125 in the direction of the first end 116-1 and a second cabling 132-2 that extends from the fixture 125 in the direction of the second end 116-2. Cabling refers to cables that transfer data. For example, the first cabling 132-1 and the second cabling 132-2 can transfer navigation and/or calibration data from the CSTU 126 to additional streamer navigation equipment. In some embodiments, calibration data can be transferred through the first cabling 132-1 and the second cabling 132-2 to an external processor to analyze the calibration data. The first cabling 132-1 can extend out from the first side 116-1 and be placed up and across a U-shaped portion of a first cable support post 134-1. The second cabling 132-2 can extend out from the second side 116-2 and be placed up and across a U-shaped portion of a second cable support post 134-2. The carriage may be prevented from unlimited rotation as the first cabling 132-1 and the second cabling 132-2 may wrap around the carriage 122. In at least one embodiment, the first cabling 132-1 and the second cabling 132-2 may not go through the first roll wheel 121-1 or the second roll wheel 121-2, but can extend from the ends of the CSTU 126 and directly up toward the first cable support post 134-1 and the second cable support post 134-2 respectively. The first cabling 132-1 can rest on the first cable support post 134-1 and the second cabling 132-2 can rest on the second cable support post 134-2. As the carriage 122 is rotated, the first cabling 132-1 and the second cabling 132-2 are wrapped around the carriage 122 as many times around as rotations of the carriage 122 are performed. Further, the first cabling 132-1 and the second cabling 132-2 can extend across the pivot assembly 112 from the ends of the fixture 125.

The CSTU 126 can be secured into the fixture 125 by a first side locking mechanism 142-1 and a second side locking mechanism 142-2. A respective end closest to the center of the apparatus 100 of each of the first side locking mechanism 142-1 and second side locking mechanism 142-2 can pivot up and away from the center of the apparatus 100 to be in an unlocked position (not illustrated). While in the unlocked position, the CSTU 126 can be removed from the fixture 125. And, in the reverse, the first side locking mechanism 142-1 and second side locking mechanism 142-2 can pivot downward and toward the center of the apparatus 100 to be in a locked position (as illustrated) to hold the CSTU 126 into the fixture 125. A top locking mechanism 144 can pivot down over the CSTU 126 to lock the CSTU 126 in place.

The pitch wheel 120 can include a first fastening mechanism 136-1 and a second fastening mechanism 136-2 that can each be inserted into a respective aperture, which can be analogous to the aperture 138-1. Once the pitch wheel 120 is rotated to a position (and therefore a particular pitch of the carriage 122 and the fixture 125) for recording calibration data, the first fastening mechanism 136-1 and the second fastening mechanism 136-2 can each be inserted into the apertures and locked into place so that the pitch wheel 120 is prevented from further rotation. A first handle 137-1 and a second handle 137-2 can be used to more easily rotate the pitch wheel 120. The first roll wheel 121-1 can include a similar fastening mechanism 136-3 and a plurality of apertures, such as aperture 138-2. The second roll wheel 121-2 can include a similar fastening mechanism 136-4 and a plurality of apertures. Once the first roll wheel 121-1 and the second roll wheel 121-2 are rotated to a position (and therefore a particular roll of the carriage 122 and the fixture 125) for recording calibration data, the fastening mechanism 136-3 can be inserted into one of the number of apertures and locked into place so that the first roll wheel 121-1 and the second roll wheel 121-2 are prevented from further rotation. The first roll wheel 121-1 can include a first handle 137-3 and a second handle 137-4. The second roll wheel 121-2 can include a first handle 137-5 and a second handle 137-6. The handles can be used to more easily rotate the roll wheels. Either the first roll wheel 121-1 or the second roll wheel 121-2 can be used to adjust the roll because they are both fixedly coupled to the carriage 122, on opposite sides of the pivot assembly 112.

Figure 2:
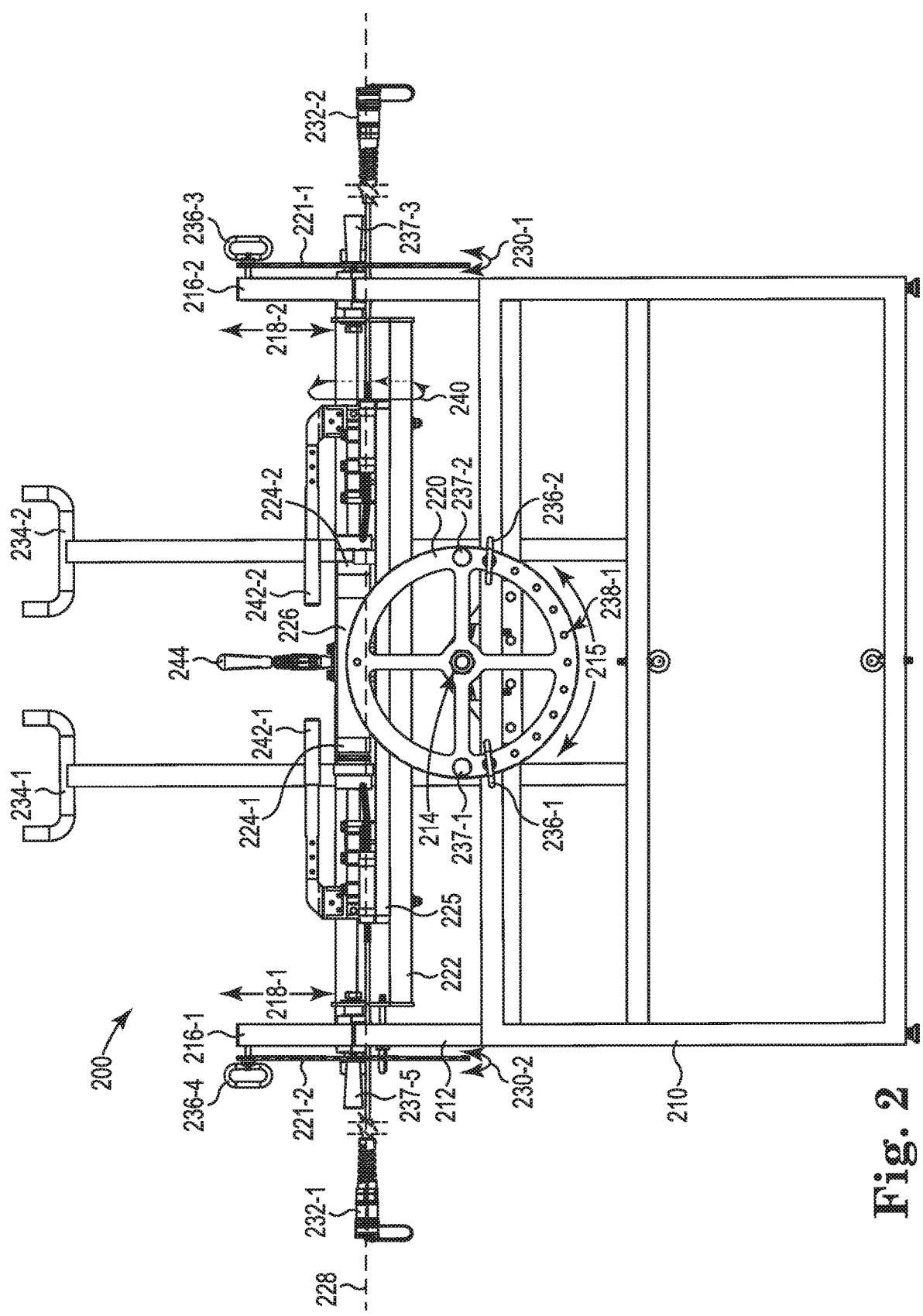
FIG. 2 illustrates a front view of an apparatus for calibration of streamer navigation equipment.

FIG. 2 illustrates a front view of an apparatus 200 for streamer navigation equipment calibration. The apparatus 200 is analogous to the apparatus 100 illustrated in FIG. 1 and includes a pivot assembly 212 and a base assembly 210. The pivot assembly 212 is rotatably coupled to the base assembly 210. The pivot assembly is fixedly coupled to the pitch wheel 220. As described in FIG. 1, as the pitch wheel 220 is rotated clockwise about a longitudinal axis 214 (as illustrated by the left arrow of 215), a first end 216-1 of the pivot assembly 212 is raised, indicated by the up arrow of 218-1 and a second end 216-2 is lowered, indicated by the down arrow 218-2. As the pitch wheel 220 is rotated counter-clockwise about the longitudinal axis 214 (as illustrated by the right arrow of 215) the first end 216-1 is lowered, indicated by the down arrow of 218-1, and the second end 216-2 is raised, indicated by the up arrow of 218-2. The pitch wheel 220 is fixedly coupled to the pivot assembly 212 through an aperture in the base assembly 210 such that as the pitch wheel 220 rotates, the pivot assembly 212 rotates an equal amount, in degrees, while the base assembly remains stationary. In this way, a pitch of the pivot assembly 212 can be adjusted. The pitch wheel 220 can include a first handle 237-1 and a second handle 237-2 that can aid in rotating the pitch wheel 220. A first fastening mechanism 236-1 and a second fastening mechanism 236-2 can be inserted into one of a plurality of apertures along the pitch wheel 220 (such as aperture 238-1) and prevent the pitch wheel 220 from continuing to rotate and lock it in place.

A carriage 222 can be rotatably coupled to the pivot assembly 212. A first roll wheel 221-1 and a second roll wheel 221-2 can be fixedly coupled to the carriage 222 such that as the roll wheels are rotated, as indicated by arrows 230-1 and 230-2, about a longitudinal axis 228, the carriage is rotated, as indicated by arrow 240, an equal amount, in degrees, about the longitudinal axis 228. The first roll wheel 221-1 can include a fastening mechanism 236-3 and a first handle 237-3. The second roll wheel 221-2 can include a second fastening mechanism 236-4 and a second handle 237-5. A fixture 225 can be fixedly coupled to the carriage 222. A compass streamer telemetry unit (CSTU) 226 can be inserted onto the fixture 225 and held in place by a first side locking mechanism 242-1, a second side locking mechanism 242-2, and a top locking mechanism 244. As the locking mechanism 242-1 is raised upward, a first coupler 224-1 can move toward the left, as illustrated. As the locking mechanism 242-2 is raised upward, a second coupler 224-1 can move toward the right, as illustrated. In this way, the first coupler 224-1 and the second coupler 224-2 can move outward from the center of apparatus 200 and make room for the CSTU 226 to be inserted between them. Once inserted, the first locking mechanism 242-1 and the second locking mechanism 242-2 can be lowered and the first coupler 224-1 and the second coupler 224-2 can move inward toward the center of the apparatus 200 and lock the CSTU 226 in place. The fixture 225 can include first cabling 232-1 that exits the apparatus 200 to the left and second cabling 232-2 that exits the apparatus 200 to the right, as illustrated. The first cabling 232-1 can be placed up and over a U-shaped portion of the first cable support posts 234-1. The second cabling 232-2 can be placed up and over a U-shaped portion of the second cable support posts 234-2.

Figure 3:
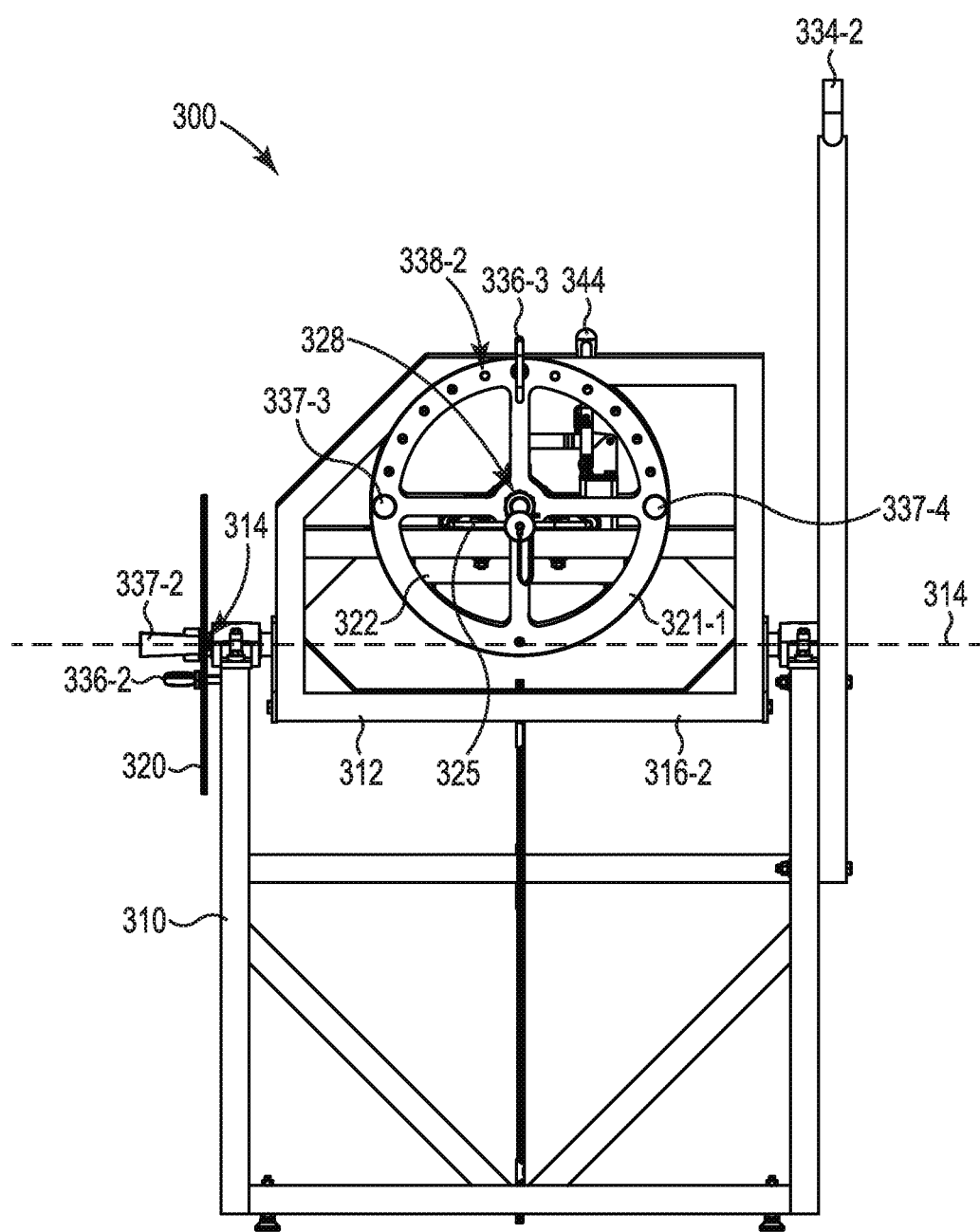
FIG. 3 illustrates a side view of an apparatus for calibration of streamer navigation equipment.

FIG. 3 illustrates a side view of an apparatus 300 for calibration of streamer navigation equipment. The apparatus 300 is analogous to the apparatus 100 illustrated in FIG. 1. A pitch wheel 320 can be used to rotate the pivot assembly 312 (illustrated in FIG. 3 as the second end 316-2 of the pivot assembly 312) to adjust pitch. The pitch wheel 320 can be rotatably coupled to a base assembly 310 such that as the pitch wheel 320 rotates, the base assembly 310 remains stationary while the pitch wheel 320 and the pivot assembly 312 rotate. The pitch wheel 320 can include a handle 337-2 to turn the pitch wheel 320 and a fastening mechanism 336-2 to lock the pitch wheel 320 in place. Rotating the pitch wheel 320 can rotate the pivot assembly 312 about a lateral axis 314.

A first roll wheel 321-1 can be fixedly coupled to a carriage 322 and rotatably coupled to the pivot assembly 312. As the first roll wheel 321-1 is rotated, the carriage 322 rotates an equal amount, in degrees, about the longitudinal axis 328. Rotating the first roll wheel 321-1 and the carriage 322 can adjust a roll of the carriage 322 (and therefore a roll of a compass of a STU coupled to the fixture 325). The first roll wheel 321-1 can include a first handle 337-3 and a second handle 337-4 to assist in rotating the first roll wheel 321-1. The first roll wheel 321-1 can include a plurality of apertures (one such aperture being 338-2) and a fastening mechanism 336-3 to lock the first roll wheel 321-1 and prevent it from further rotating. A cable support post 334-2 can be fixedly coupled to the base assembly 310 to hold cables that may extend from the fixture 325, such as fixture 125 in FIGS. 1 and/or 225 in FIG. 2. A top locking mechanism 344 can be used to lock a CSTU in place onto the fixture 325.

Figure 4:
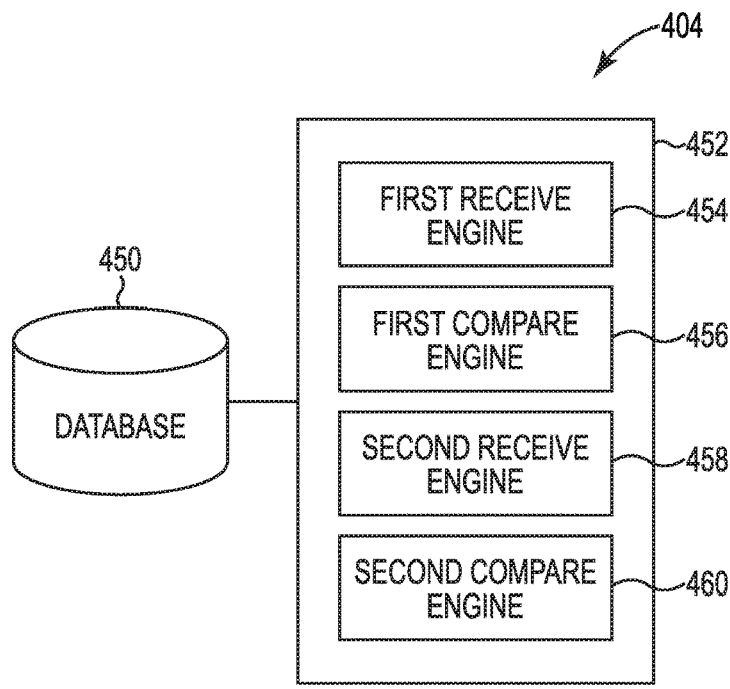
FIG. 4 illustrates a diagram of a system for calibration of streamer navigation equipment.

FIG. 4 illustrates a diagram of a system 404 for calibration of streamer navigation equipment. The system 404 can include a database 450, a subsystem 452, and a number of engines, such as a first receive engine 454, a first compare engine 456, a second receive engine 458, and a second compare engine 460. The subsystem 452 and engines can be in communication with the database 450 via a communication link. The system 452 can include additional or fewer engines than illustrated to perform the various functions described herein. The system can represent program instructions and/or hardware of a machine such as the machine 505 referenced in FIG. 5, etc. As used herein, an "engine" can include program instructions and/or hardware, but at least includes hardware. Hardware is a physical component of a machine that enables it to perform a function. Examples of hardware can include a processing resource, a memory resource, a logic gate, etc. While this example illustrates the system 404 with a database 450, examples are not so limited. In some examples, calibration data from a flow of calibrations can be stored in individual files that are not stored in a database format.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The first receive engine 454 can include a combination of hardware and program instructions that is configured to receive a first set of telemetry calibration data points. The first set of telemetry calibration data points is associated with a first set of positions of a compass of a STU. The first set of positions can be associated with a fixed first pitch and a plurality of roll positions of the compass. For example, the first set of positions can be associated with rotating a carriage (e.g., rotating the first roll wheel 121-1 and thereby carriage 122) to adjust a roll of a compass while maintaining a fixed first pitch of the compass (e.g., not rotating pitch wheel 120 and thereby not rotating the pivot assembly 112). Fixed can refer to something that is held constant, For example, a fixed pitch can refer to a pitch that is held constant. The first set of telemetry data points can be acquired while adjusting the roll as the compass goes through the first set of positions. The first compare engine 456 can include a combination of hardware and program instructions that is configured to compare the first set of telemetry calibration data points to an expected telemetry field shape based on the first number of positions.

The second receive engine 458 can include a combination of hardware and program instructions that is configured to receive a second set of telemetry calibration data points associated with a second set of positions of the compass. The second set of positions can be associated with a fixed second pitch and a plurality of roll positions of the compass. For example, the second set of positions can be associated with rotating a carriage (e.g., rotating the first roll wheel 121-1 and thereby carriage 122) to adjust a roll of a compass while maintaining a fixed second pitch of the compass (e.g., not rotating pitch wheel 120 and thereby not rotating the pivot assembly 112). The second set of telemetry data points can be acquired while adjusting the roll as the compass goes through the second set of positions. The first pitch is a different pitch than the second pitch.

The second compare engine 460 can include a combination of hardware and program instructions that is configured to compare the second set of telemetry calibration data points to an expected telemetry field shape based on the second position. The second set of telemetry calibration data points can be compared to the expected telemetry field shape based on a calibration method. For example, the second set of telemetry calibration data points can be compared to the expected telemetry field shape using algebraic fitting, or orthogonal fitting, among other methods.

In addition, though not illustrated, a third receive engine can include a combination of hardware and program instructions that is configured to receive a third set of telemetry calibration data points associated with a third set of positions of the compass. The third set of positions can be associated with a third fixed pitch and a plurality of roll positions of the compass. For example, the third set of positions can be associated with rotating a carriage (e.g., rotating the first roll wheel 121-1 and thereby carriage 122) to adjust a roll of a compass while maintaining a fixed third pitch of the compass (e.g., not rotating pitch wheel 120 and thereby not rotating the pivot assembly 112). The third set of telemetry data points can be acquired while adjusting the roll as the compass goes through the third set of positions. In at least one example, the third pitch is a different pitch than the first pitch and the second pitch.

In addition, though not illustrated, a third compare engine can include a combination of hardware and program instructions that is configured to compare the third set of telemetry calibration data points to an expected telemetry field shape based on the third position. The third set of telemetry calibration data points can be compared to the expected telemetry field shape based on a calibration method. For example, the third set of telemetry calibration data points can be compared to the expected telemetry field shape using algebraic fitting, or orthogonal fitting, among other methods.

In at least one embodiment, a first set of telemetry calibration data points can be associated with a first set of positions of a compass of a STU. The first set of positions can be associated with a fixed pitch and a plurality of roll positions of the compass. A second set of telemetry calibration data points can be associated with a second set of positions of the compass. The second set of positions can be associated with a fixed roll and a plurality of pitch positions of the compass. For example, the second set of positions can be associated with rotating a pivot assembly (e.g., rotating pivot assembly 112 and thereby adjusting the pitch of carriage 122 in FIG. 1) to adjust a pitch of a compass while maintaining a fixed roll of the compass (e.g., not rotating the carriage 122 and thereby not adjusting the roll). The second set of telemetry data points can be acquired while adjusting the pitch as the compass goes through the second set of positions. In the at least one example, the first set of calibration data points and the second set of calibration data points can be compared to an expected telemetry field shape based on the calibration method.

In at least one embodiment, a fixed pitch of the compass can be maintained while adjusting a roll of the compass during a first set of data acquisitions and a fixed roll of the compass can be maintained while adjusting the pitch of the compass during a second set of data acquisitions. In at least one embodiment, a first pitch of the compass can be maintained while adjusting a roll of the compass during a first period of data acquisition and a second pitch of the compass can be maintained while adjusting the roll of the compass during data acquisition during a second period of data acquisition. In addition, a first roll of the compass can be maintained while adjusting a pitch of the compass during a third period of data acquisition and a second roll of the compass can be maintained while adjusting a pitch of the compass during a fourth period of data acquisition.

While adjustment of the roll and pitch is illustrated as using wheels (such as pitch wheel 120 and roll wheels 121-1 and 121-2 in FIG. 1) to perform manually, embodiments are not so limited. For example, the roll and pitch of the compass can be adjusted automatically using a servomotor and/or additional electrical and mechanical equipment to hold the compass at particular pitch angles and roll positions while automatically acquiring the calibration data at these corresponding angles and positions.

The following is a description of how telemetry calibration data points are used to determine a heading of a streamer and corresponding calibration parameters. A geomagnetic field and gravity of earth can be described by two vectors:

$$G_{ref} = \begin{bmatrix} 0 \\ 0 \\ g \end{bmatrix} \quad (1)$$

$$B_{ref} = B \begin{bmatrix} \cos(\delta) \\ 0 \\ \sin(\delta) \end{bmatrix} \quad (2)$$

The magnetic inclination angle can be given by $\delta$, and the magnetic field strength and the gravity field strength can be given by B and g respectively. The axes of the compass of the STU can be described by an NED (North (x), East (y), Down (z)) coordinate system and rotations about these axes can be described by rotation matrices. The compass can include an accelerometer sensor and a magnetometer sensor. The accelerometer sensor can be used to detect changes in acceleration of the compass and the magnetometer can be used to detect a magnetic field and can detect fluctuations in the Earth's magnetic field. The rotation matrices define how to rotate an object about the axes of the coordinate system. The rotation matrices $R_x(\theta_x)$, $R_y(\theta_y)$ and $R_z(\theta_z)$ represent rotation about the x, y and z axes respectively.

$$R_x(\theta_x) = \begin{bmatrix} 1 & 0 & 0 \\ 0 & \cos(\theta_x) & \sin(\theta_x) \\ 0 & -\sin(\theta_x) & \cos(\theta_x) \end{bmatrix}, \quad (3)$$

$$R_y(\theta_y) = \begin{bmatrix} \cos(\theta_y) & 0 & -\sin(\theta_y) \\ 0 & 1 & 0 \\ \sin(\theta_y) & 0 & \cos(\theta_y) \end{bmatrix},$$

$$R_z(\theta_z) = \begin{bmatrix} \cos(\theta_z) & \sin(\theta_z) & 0 \\ -\sin(\theta_z) & \cos(\theta_z) & 0 \\ 0 & 0 & 1 \end{bmatrix}$$

The output from an accelerometer sensor of the compass can be described as $G_p$, and can be a function of the CSTUs orientation.

$$G_p = \begin{bmatrix} accX \\ accY \\ accZ \end{bmatrix} = R_x(\theta_x) \cdot R_y(\theta_y) \cdot R_z(\theta_z) \cdot \begin{bmatrix} 0 \\ 0 \\ g \end{bmatrix} \quad (4)$$

Similarly, the output from a magnetometer sensor of the compass can be described as:

$$B_p = \begin{bmatrix} magX \\ magY \\ magZ \end{bmatrix} = R_x(\theta_x) \cdot R_y(\theta_y) \cdot R_z(\theta_z) \cdot B \begin{bmatrix} \cos(\delta) \\ 0 \\ \sin(\delta) \end{bmatrix} \quad (5)$$

To be able to calculate the heading of the CSTU, the accelerometer is used to calculate the pitch and roll angles. These angles can be expressed as:

$$\tan(\theta_x) = \frac{accY}{accZ} \quad (6)$$

$$\tan(\theta_y) = \frac{-accX}{accY \cdot \sin(\theta_x) + accZ \cdot \cos(\theta_x)} \quad (7)$$

The roll angle is associated with (6) and the pitch angle is associated with (7). In order to perform calibration, the roll and pitch angles (by rotating the carriage to adjust roll and rotating the pivot assembly to adjust pitch) can be used to "up-rotate" the magnetometer to get values for the magnetic horizontal components (x and y). An example of how the telemetry calibration data points are compared to an expected telemetry field shape is described below.

$B_p$ can be recalculated and rewritten to express the heading ($\theta_z$).

$$\tan(\theta_z) = \frac{magZ \cdot \sin(\theta_x) - magY \cdot \cos\theta_x}{magX \cdot \cos(\theta_y) + magY \cdot \sin(\theta_y) \cdot \sin(\theta_x) + magZ \cdot \sin(\theta_y) \cdot \cos(\theta_x)} \quad (8)$$

$\tan(\theta_z)$ can express how to calculate the heading if the CSTU was oriented along the axes of the CSTU and if the sensors are providing accurate readings. The simplified operations (4) and (5) above can be updated to include calibration matrices and correct for module orientation.

$$G_p = W_g \cdot R_z(\alpha) \cdot R_y(\beta) \cdot R_x(\theta_x) \cdot R_y(\theta_y) \cdot R_z(\theta_z) \cdot \begin{bmatrix} 0 \\ 0 \\ g \end{bmatrix} + V_g \quad (9)$$

$$B_p = W_B \cdot R_z(\alpha) \cdot R_x(\theta_x) \cdot R_y(\theta_y) \cdot R_z(\theta_z) \cdot B \begin{bmatrix} \cos(\delta) \\ 0 \\ \sin(\delta) \end{bmatrix} + V_B \quad (10)$$

The offset vectors $V_g$ and $V_B$ can be 3×1 vectors describing the offset magnitude on the x, y and z sensor axes (referred to as $W_g$ below). The offset vector $V_B$, incorporates the offsets generated by the sensor bias and the hard iron effect.

$$W_g = \begin{bmatrix} a_x & 0 & 0 \\ 0 & a_y & 0 \\ 0 & 0 & a_z \end{bmatrix} \quad (11)$$

The accelerometer sensor's sensitivity is described by a diagonal matrix and the misalignment is a rotation matrix defining the orientation of the sensor related to the orientation of the CSTU. The CSTU can be intentionally mounted with a −45° angle about the z-axis (a). The CSTU can be mounted as such to get all three axes activated during a CSTU roll. The misalignment angle β could be close to 0°. The calibration matrix $W_B$, shown below, can be more complicated. For example, $W_B$ can be described by three 3×3 matrices. However, the form of the three matrices can vary.

$$W_B = S_f \cdot S_m \cdot S_{si} \quad (12)$$

The matrices $S_f$, $S_m$ and $S_{si}$ describes the scale factor, the nonorthogonality and the soft iron effect respectively and, in its most general form, can consist of 9 independent variables:

$$W_B = \begin{bmatrix} m_{xx} & m_{xy} & m_{xz} \\ m_{yx} & m_{yy} & m_{yz} \\ m_{zx} & m_{zy} & m_{zz} \end{bmatrix} \quad (13)$$

The output from the calibrated sensors can be written:

$$G_{P_{cal}} = \begin{bmatrix} accX_{cal} \\ accY_{cal} \\ accZ_{cal} \end{bmatrix} = R_y(-\beta)R_z(-\alpha)W_g^{-1}(G_P - V_g) \quad (14)$$

$$B_{P_{cal}} = \begin{bmatrix} magX_{cal} \\ magY_{cal} \\ magZ_{cal} \end{bmatrix} = R_z(-\alpha)W_B^{-1}(B_P - V_B) \quad (15)$$

The reason for emitting the rotation matrix $R_y(-\beta)$ in the magnetometer calibration is due to the general form of $W_B$. β will be close to zero and any deviation will be captured in $W_B$.

Distortions of the earth's magnetic field can be a result of external magnetic influences generally referred to as either a hard iron effect or a soft iron effect. If no distorting effects are present, rotating a magnetometer through a minimum of 360 degrees and plotting the resulting data as a y-axis vs. x-axis can result in a circle centered around coordinates (0,0). However, anomalies due to hard or soft iron effects can produce perturbations of the circle as a simple offset from (0,0) in the case of a hard-iron effect or deform the circle to produce an ellipse in the case of a soft-iron effect. Hard-iron effect distortion can be produced by material that exhibits a constant, additive field to the earth's magnetic field, thereby generating a constant additive value to the output of each of the magnetometer's axes. If the orientation and position of the magnet relative to a sensor is constant, the field and associated offsets will be constant. Compensating for these distortions can include determining the x and y offsets and applying these constants to the data. Soft-iron distortions can be the result of material that influences, or distorts, a magnetic field, but is not additive. Thus, soft-iron distortion cannot be compensated for with a simple constant and uses more complicated procedures. A soft-iron distortion is usually exhibited as a perturbation of the ideal circle into an ellipse.

Optimal calibration parameters and rotation angles can be determined by estimating calibration variables, such as α, β, $W_b$, $W_g$, $V_B$ and $V_g$. Two fitting models can be used to determine the calibration parameters and rotation angles. The first is referred to as algebraic fitting and the second is referred to as orthogonal fitting. Algebraic fitting refers to use of an ellipsoid to solve for parameters of A, B, C, D, E, F, G, H, and I directly. An operation can have a quadratic form of:

$$Q \stackrel{def}{=} Ax^2 + By^2 + Cz^2 + 2Dxy + 2Exz + 2Fyz + 2Gx + 2Hy + 2Iz - 0 \quad (16)$$

The operation can have nine independent variables and can be written in matrix form as:

$$x^T A\, x_q = 0 \quad (17)$$

Here, x is given by $$x = \begin{bmatrix} x \\ y \\ z \\ 1 \end{bmatrix} \quad (18)$$

and $A_q$ is given by $$A_q = \begin{bmatrix} A & D & E & G \\ D & B & F & H \\ E & F & C & I \\ G & H & I & -1 \end{bmatrix} \quad (19)$$

The center of the ellipsoid can be found where the gradient of Q vanishes:

$$\nabla Q = \left[\frac{\partial Q}{\partial x}, \frac{\partial Q}{\partial y}, \frac{\partial Q}{\partial z}\right] = 0 \quad (20)$$

and can be found by solving:

$$\begin{bmatrix} A & D & E \\ D & B & F \\ E & F & C \end{bmatrix} \begin{bmatrix} x_0 \\ y_0 \\ z_0 \end{bmatrix} = \begin{bmatrix} -G \\ -H \\ -I \end{bmatrix} \quad (21)$$

The ellipsoid can be translated to the origin by multiplying x with the translation matrix (T).

$$T = \begin{bmatrix} 1 & 0 & 0 & x_0 \\ 0 & 1 & 0 & y_0 \\ 0 & 0 & 1 & z_0 \\ 0 & 0 & 0 & 1 \end{bmatrix} \quad (22)$$

$$(Tx)^T A_q (Tx) = 0 \quad (23)$$

$$x^T (T^T A_q T) x = 0 \quad (24)$$

The rotation matrix R can now be expressed in terms of $A_q$ and T.

$$R = T^T A_q T = \begin{bmatrix} r_{11} & r_{12} & r_{13} & r_{14} \\ r_{21} & r_{22} & r_{23} & r_{24} \\ r_{31} & r_{32} & r_{33} & r_{34} \\ r_{41} & r_{42} & r_{43} & r_{44} \end{bmatrix} \quad (25)$$

$$x^T R x = 0 \quad (26)$$

The eigenvectors and the semi-axes of the ellipsoid can be found by solving the eigenvalue problem of matrix S defined as:

$$S = -\frac{1}{r_{44}} \begin{bmatrix} r_{11} & r_{12} & r_{13} \\ r_{21} & r_{22} & r_{23} \\ r_{31} & r_{32} & r_{33} \end{bmatrix} \quad (27)$$

If the offset vector, v, is defined as $$v = \begin{bmatrix} x_0 \\ y_0 \\ z_0 \end{bmatrix} \quad (28)$$

the ellipsoid can be represented using the new matrices.

$$(x-v)^T S(x-v) = 1 \quad (29)$$

To obtain the linear transformation from an ellipsoid to a sphere, the square root of S can be used. The square root of S is equal to $w^{-1}$ and can be applied as shown in (14) and (15) for the magnetometer and accelerometer. The construction of S where $A_q$ is symmetric and T is a translation matrix can impose a symmetric constraint on S. A real symmetric matrix can be diagonalized by:

$$S = Q \Lambda Q^T \quad (30)$$

In (30), Q can be a real orthogonal matrix holding the eigenvectors of S and $\Lambda$ as a diagonal matrix with the real eigenvalues of S. If the principal axes of the ellipsoid are along the sensor axes, the eigenvectors ($e_i$) will simply be:

$$e_1 = \begin{bmatrix} 1 \\ 0 \\ 0 \end{bmatrix}, e_2 = \begin{bmatrix} 0 \\ 1 \\ 0 \end{bmatrix}, e_3 = \begin{bmatrix} 0 \\ 0 \\ 1 \end{bmatrix}$$

The sensor sensitivities can further be calculated from the eigenvalues, $\lambda_1$, $\lambda_2$ and $\lambda_3$ $$s_x = \frac{1}{\sqrt{\lambda_1}}, sy = \frac{1}{\sqrt{\lambda_2}}, sz = \frac{1}{\sqrt{\lambda_3}} \quad (31)$$

In the example of a skewed ellipsoid, the eigenvectors can have cross terms and a 3×3 sensitivity correction matrix can be computed as:

$$S_{sqrt} = w^{-1} = [e_1 \; e_2 \; e_3] \begin{bmatrix} 1/sx & 0 & 0 \\ 0 & 1/sy & 0 \\ 0 & 0 & 1/sz \end{bmatrix} [e_1 \; e_2 \; e_3]^T \quad (32)$$

The sensitivity correction matrix $S_{sqrt}$ is the inverse of the $W_g$ and $W_B$ matrices for the accelerometer and the magnetometer respectively. $S_{sqrt}$ will take the form as:

$$S_{sqrt} = \begin{bmatrix} s_{xx} & s_{xy} & s_{xz} \\ s_{xy} & s_{yy} & s_{yz} \\ s_{xz} & s_{yz} & s_{zz} \end{bmatrix} \quad (33)$$

and includes 6 independent variables. (11) shows that $W_g$ is described by 3 variables. For $W_g$, the cross terms $s_{xy}$, $s_{xz}$ and $s_{yz}$ are zero. In the construction of $S_{sqrt}$, a symmetric constraint and rotation of the axes cannot be determined by this calibration type. Further, this particular solution may be more sensitive to noise compared to orthogonal fitting.

Orthogonal fitting can be less affected by noise. Orthogonal fitting can use an iterative solver to find its minimum. The optimization operation for orthogonal fitting includes:

$$\min_{w_{ij}^{-1}, x_0, y_0, z_0} \sum_i \left( \left\| w^{-1} \left( \begin{bmatrix} x[i] \\ y[i] \\ z[i] \end{bmatrix} - \begin{bmatrix} x_0 \\ y_0 \\ z_0 \end{bmatrix} \right) \right\|_2 - 1 \right)^2 \quad (34)$$

There can be different ways of writing $w^{-1}$. In the most general form $w^{-1}$ is written as:

$$w^{-1} = \begin{bmatrix} s_{xx} & s_{xy} & s_{xz} \\ s_{yx} & s_{yy} & s_{yz} \\ s_{zx} & s_{zy} & s_{zz} \end{bmatrix} \quad (35)$$

The optimization problem will consist of 12 independent variables. The criteria of magnetometer measurements to lay on the surface of a sphere after calibration are not enough to uniquely define the 12 parameters. For (34) to uniquely define a set of calibration parameters, $w^{-1}$ needs to be restricted to be symmetric. However, by including additional cost functions the full set of 12 parameters can be estimated.

Figure 5:
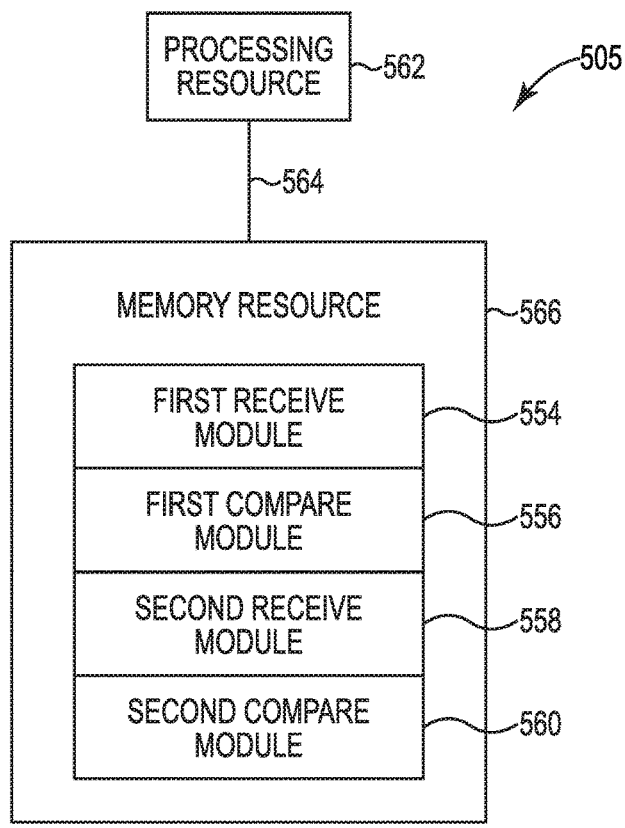
FIG. 5 illustrates a diagram of a machine for calibration of streamer navigation equipment.

FIG. 5 illustrates a diagram of a machine 505 for calibration of streamer navigation equipment. The machine 505 can utilize software, hardware, firmware, and/or logic to perform a number of functions. The machine 505 can be a combination of hardware and program instructions configured to perform a number of functions. The hardware, for example, can include processing resources 562 and memory resources 566, such as a machine-readable medium or other non-transitory memory resources 566. The memory resources 566 can be internal and/or external to the machine 505. For example, the machine 505 can include internal memory resources and have access to external memory resources. The program instructions, such as machine-readable instructions, can include instructions stored on the machine-readable medium to implement a particular function, for example, an action such as receiving a first set of telemetry calibration data points. The set of machine-readable instructions can be executable by one or more of the processing resources 562. The memory resources 566 can be coupled to the machine 505 in a wired and/or wireless manner. For example, the memory resources 505 can be an internal memory, a portable memory, a portable disk, or a memory associated with another resource, for example, enabling machine-readable instructions to be transferred or executed across a network such as the Internet. As used herein, a "module" can include program instructions and/or hardware, but at least includes program instructions.

Memory resources 566 can be non-transitory and can include volatile and/or non-volatile memory. Volatile memory can include memory that depends upon power to store data, such as various types of dynamic random access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and a solid state drive, etc., as well as other types of non-transitory machine-readable media.

The processing resources 562 can be coupled to the memory resources 566 via a communication path 564. The communication path 564 can be local or remote to the machine 505. Examples of a local communication path 564 can include an electronic bus internal to a machine, where the memory resources 566 are in communication with the processing resources 562 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 564 can be such that the memory resources 566 are remote from the processing resources 562, such as in a network connection between the memory resources 566 and the processing resources 562. That is, the communication path 564 can be a network connection. Examples of such a network connection can include a local area network, wide area network, personal area network, and the Internet, among others.

As shown in FIG. 5, the machine-readable instructions stored in the memory resources 566 can be segmented into a plurality of modules 554, 556, 558, and 560 that when executed by the processing resources 562 can perform a number of functions. As used herein a module includes a set of instructions included to perform a particular task or action. The number of modules 554, 556, 558, and 560 can be sub-modules of other modules. For example, the first receive module 554 can be a sub-module of the first compare module 556, and the second receive module 558 and the second compare module 560 can be contained within a single module. Furthermore, the number of modules 554, 556, 558, and 560 can comprise individual modules separate and distinct from one another. Examples are not limited to the specific modules 554, 556, 558, and 560 illustrated in FIG. 5.

Each of the number of modules 554, 556, 558, and 560 can include program instructions or a combination of hardware and program instructions that, when executed by a processing resource 562, can function as a corresponding engine as described with respect to FIG. 4. For example, the first receive module 554 can include program instructions or a combination of hardware and program instructions that, when executed by a processing resource 562, can function as the first receive engine 454. The first compare module 556 can include program instructions or a combination of hardware and program instructions that, when executed by a processing resource 562, can function as the first compare engine 456. The second receive module 558 can include program instructions or a combination of hardware and program instructions that, when executed by a processing resource 562, can function as the second receive engine 458. The second compare module 560 can include program instructions or a combination of hardware and program instructions that, when executed by a processing resource 562, can function as the second compare engine 460.

The program instructions can be executed by the processing resource 562 to generate a calibration value and a heading value for the CSTU based on calibration described in association with FIG. 4. The program instructions can be executed to determine a set of calibration values and heading values associated with the compass. A calibration value and a heading value can be used to determine an accuracy of a first set and a second set of telemetry calibration data points that are acquired while performing calibration acquisitions (e.g., adjusting rolls or pitches, as described in association with FIGS. 1-3). The calibration value and the heading value can be used to adjust the calibration values to bring them to a full accuracy value so that future acquired navigational data is in line with what would be expected. A full accuracy value refers to an accuracy value that indicates that the heading value and calibration values acquired are completely accurate with respect to an actual heading value and calibration value of the navigation equipment. The program instructions can be executed to determine an accuracy value of the first set of telemetry calibration data points and the second set of telemetry calibration data points in comparison to the expected telemetry field shape. The accuracy value indicates how accurate the first and second sets of telemetry calibration data points are when compared to the expected telemetry field shape. The program instructions can be executed to receive a third set of telemetry calibration data points associated with a third position of a compass. The third position can be associated with a third pitch and a third roll of the compass. The program instructions can be executed to compare the third set of telemetry calibration data points to an expected telemetry field shape based on the third position.

In accordance with at least one embodiment of the present disclosure, a geophysical data product may be produced. Geophysical data may be obtained and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore.

Figure 6:
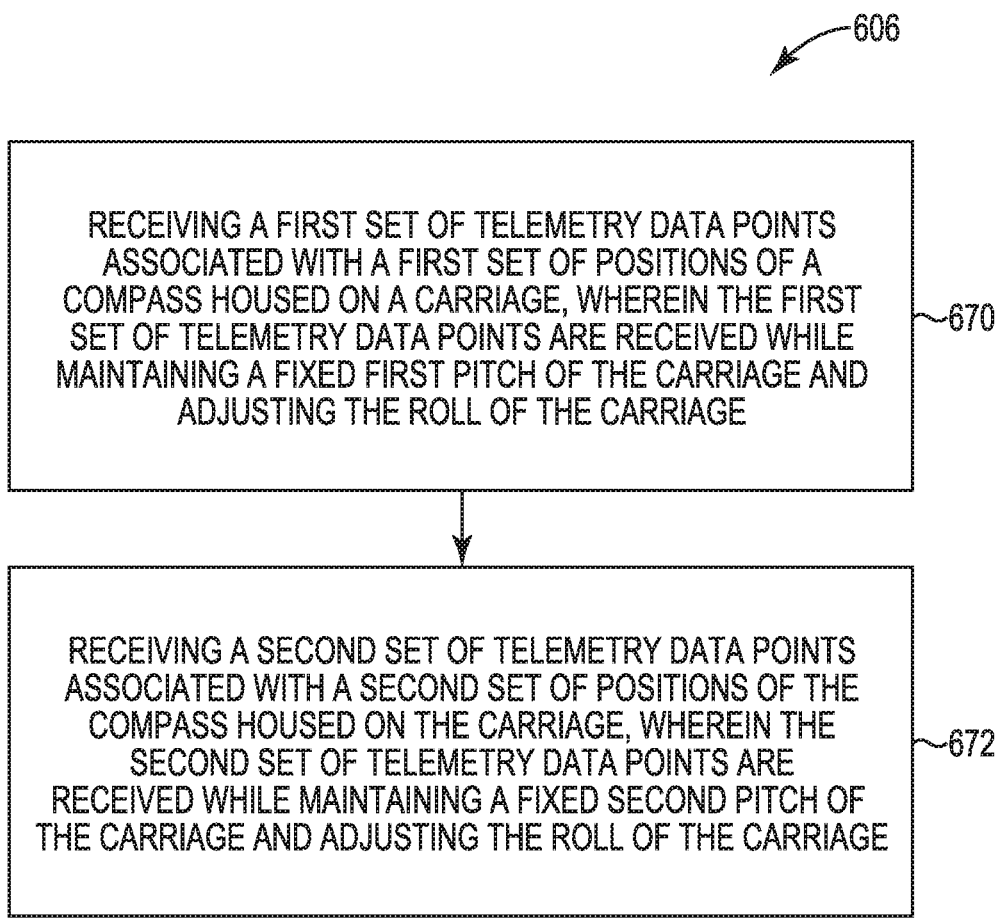
FIG. 6 illustrates a method flow diagram for calibration of streamer navigation equipment.

FIG. 6 illustrates a method flow diagram for calibration of streamer navigation equipment in accordance with at least one embodiment of the present disclosure. At block 670, the method can include receiving a first set of telemetry data points associated with a first set of positions of a compass housed on a carriage. The first set of telemetry data points can be received while maintaining a fixed first pitch of the carriage and adjusting the roll of the carriage.

At block 672, the method can include receiving a second set of telemetry data points associated with a second set of positions of the compass housed on the carriage. The second set of telemetry data points can be received while maintaining a fixed second pitch of the carriage and adjusting the roll of the carriage.

The method can include receiving a third set of telemetry data points associated with a third set of positions of the compass housed on the carriage. The third set of telemetry data points can be received while maintain a fixed third pitch of the carriage and adjusting the roll of the carriage.

The method can include comparing the first set and the second set of telemetry data points to an expected telemetry field shape. The first set of telemetry data points can be compared to the expected telemetry field shape to determine whether there are navigational deviations in a compass from what would be expected based on the particular pitch and roll of the compass and other navigational parameters. In response to the first set of telemetry data points and the expected telemetry field shape being compared as expected, additional heading value corrections may not be necessary. In addition, in response to the second set of telemetry data points and the expected telemetry field shape being compared as expected, additional heading value corrections may not be necessary in association with the second set of telemetry data points. Further, the third set of telemetry data points can be compared to the expected telemetry field shape to determine whether there are navigational deviations in the compass from what would be expected based on the particular pitch and roll of the compass and other navigational parameters. Additional heading value corrections may not be necessary based on the comparisons.

In response to the first, the second, and the third set of telemetry data points not being what is expected based on comparison with the expected telemetry field shape, the method can include determining a set of calibration values based on differences between the first and the second set of telemetry data points and the expected telemetry field shape, between the first, the second, and the third set of telemetry data points and the expected telemetry field shape, etc. For example, the set of calibration values can be used to adjust the first and the second set of telemetry data points in order to bring the first and the second set of telemetry data points in line with the expected telemetry field shape so that the compass operates as expected. In this way, the heading values of the compass can be adjusted so that the compass operates as expected in the field while gathering navigational data. These calibrations, calculations, comparisons, etc. can be performed while in a pre-field setting (e.g., a factory, a location prior to launching streamers on a marine vessel, etc.).

Figure 7:
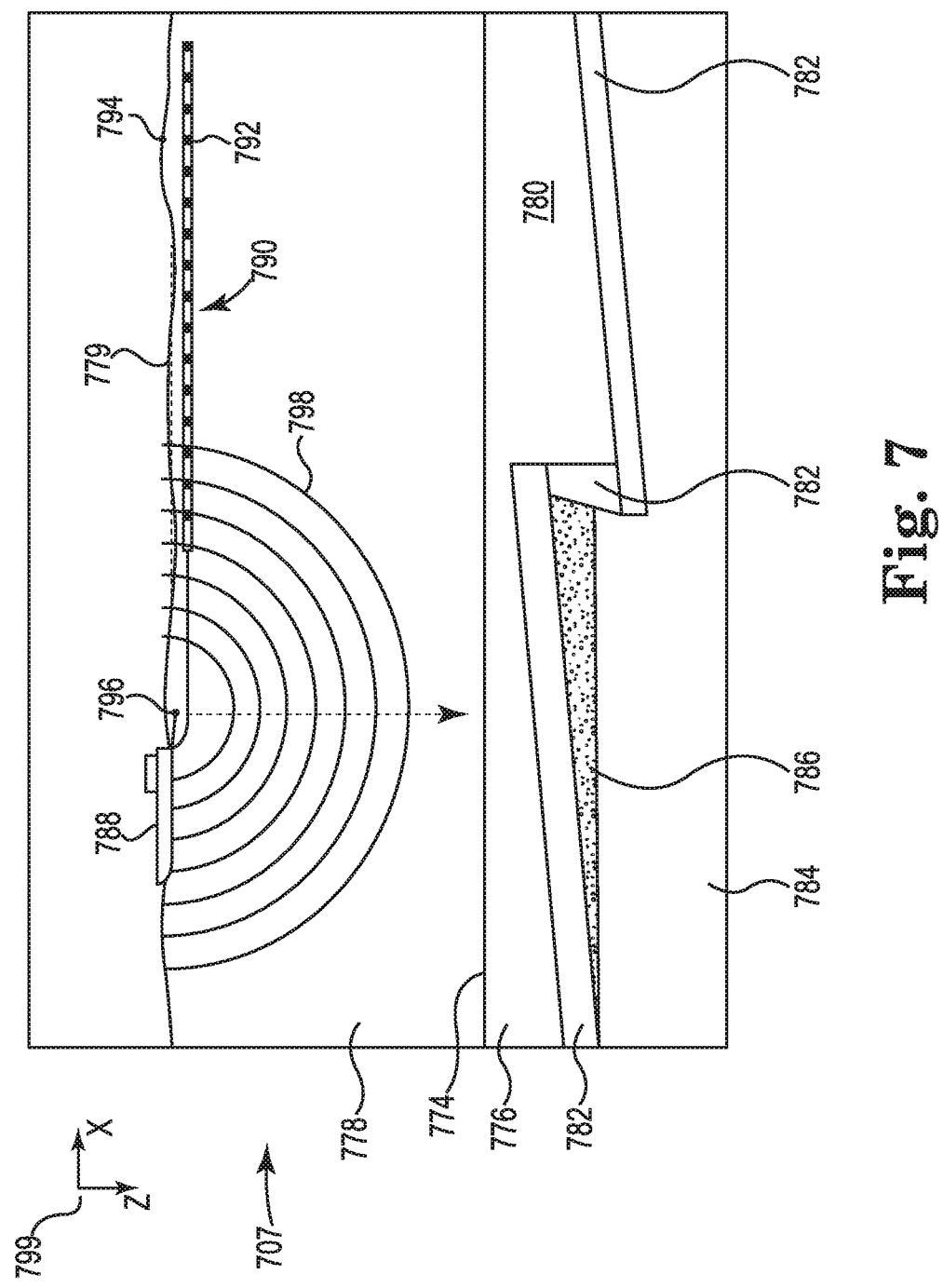
FIG. 7 illustrates a front elevation or xz-plane view of marine surveying in which acoustic signals are emitted by a source for recording by receivers.

FIG. 7 illustrates an elevation or xz-plane 799 view of marine surveying in which acoustic signals are emitted by a source 796 for recording by receivers 792. The recording can be used for processing and analysis in order to help characterize the structures and distributions of features and materials underlying the surface of the earth. FIG. 7 illustrates a domain volume 707 of the earth's surface comprising a subsurface volume 776 of sediment and rock below the surface 774 of the earth that, in turn, underlies a fluid volume 778 of water having a water surface 779 such as in an ocean, an inlet or bay, or a large freshwater lake. The domain volume 707 shown in FIG. 7 represents an example experimental domain for a class of marine surveys. FIG. 7 illustrates a first sediment layer 780, an uplifted rock layer 782, second, underlying rock layer 784, and hydrocarbon-saturated layer 786. One or more elements of the subsurface volume 776, such as the first sediment layer 780 and the first uplifted rock layer 782, can be an overburden for the hydrocarbon-saturated layer 786. In some instances, the overburden may include salt.

FIG. 7 shows an example of a marine survey vessel 788 equipped to carry out marine surveys. In particular, the marine survey vessel 788 can tow one or more streamers 790 (shown as one streamer for ease of illustration) generally located below the water surface 779. The streamers 790 can be long cables containing power and data-transmission lines (electrical, optical fiber, etc.) to which receivers may be coupled. The streamers 790 can each include a compass streamer telemetry unit (CSTU) with a compass used for navigational purposes. The compasses can be calibrated by adjusting a pitch and/or a roll of the compass during telemetry data collection to verify and/or adjust heading values acquired by the compass. In one type of marine survey, each receiver, such as the receiver 792 represented by the shaded disk in FIG. 7, comprises a pair of sensors including a geophone that detects particle displacement within the water by detecting particle motion variation, such as velocities or accelerations, and/or a hydrophone that detects variations in pressure. In one type of marine survey, each marine survey receiver, such as marine survey receiver 792, comprises an electromagnetic receiver that detects electromagnetic energy within the water. The streamers 790 and the marine survey vessel 788 can include sensing electronics and data-processing facilities that allow marine survey receiver readings to be correlated with absolute positions on the sea surface and absolute three-dimensional positions with respect to a three-dimensional coordinate system. In FIG. 7, the marine survey receivers along the streamers are shown to lie below the sea surface 779, with the marine survey receiver positions correlated with overlying surface positions, such as a surface position 794 correlated with the position of marine survey receiver 792. The marine survey vessel 788 can also tow one or more marine survey sources 796 that produce signals as the marine survey vessel 788 and streamers 790 move across the sea surface 779. Marine survey sources 796 and/or streamers 790 may also be towed by other vessels, or may be otherwise disposed in fluid volume 778. For example, marine survey receivers may be located on ocean bottom cables or nodes fixed at or near the surface 774, and marine survey sources 796 may also be disposed in a nearly-fixed or fixed configuration. For the sake of efficiency, illustrations and descriptions herein show marine survey receivers located on streamers, but it should be understood that references to marine survey receivers located on a "streamer" or "cable" should be read to refer equally to marine survey receivers located on a towed streamer, an ocean bottom receiver cable, and/or an array of nodes.

FIG. 7 shows source energy illustrated as an expanding, spherical signal, illustrated as semicircles of increasing radius centered at the marine survey source 796, representing a down-going wavefield 798, following a signal emitted by the marine survey source 796. The down-going wavefield 798 is, in effect, shown in a vertical plane cross section in FIG. 7. The outward and downward expanding down-going wavefield 798 may eventually reach the surface 774, at which point the outward and downward expanding down-going wavefield 798 may partially scatter, may partially reflect back toward the streamers 790, and may partially refract downward into the subsurface volume 776, becoming elastic signals within the subsurface volume 776.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A non-transitory computer-readable medium storing instructions executable by a processor to:
   receive a first set of telemetry calibration data points associated with a first set of positions of a compass, wherein reception of the first set of telemetry calibration data points occurs during adjustment of a carriage to a first plurality of roll positions using a roll wheel and the carriage is configured to receive the compass, and the first set of positions is associated with a fixed first pitch and the first plurality of roll positions;
   compare the first set of telemetry calibration data points to a first expected telemetry field shape corresponding to the first set of positions;
   receive a second set of telemetry calibration data points associated with a second set of positions of the compass, wherein reception of the second set of telemetry calibration data points occurs during adjustment of the carriage to a second plurality of roll positions using the roll wheel, and the second set of positions is associated with a fixed second pitch and the second plurality of roll positions;
   compare the second set of telemetry calibration data points to a second telemetry field shape corresponding to the second set of positions; and
   generate a set of calibration values for the compass based on the comparisons of the first and the second sets of telemetry calibration data points to the first and the second expected telemetry field shapes.

2. The medium of claim 1, further comprising instructions executable by the processor to determine an accuracy value based on the comparisons of the first and the second sets of telemetry calibration data points to the first and the second expected telemetry field shapes.

3. The medium of claim 1, further comprising instructions executable by the processor to:
   receive a third set of telemetry calibration data points associated with a third set of positions of the compass, wherein the third set of positions is associated with a fixed third pitch and a third plurality of rolls positions; and
   compare the third set of telemetry calibration data points to a third expected telemetry field shape corresponding to the third set of positions.

4. A method, comprising:
   mounting a compass in a carriage, wherein the carriage is configured to be coupled to a roll wheel and to a pivot wheel such that a roll of the carriage is determined by the roll wheel and a pitch of the carriage is determined by the pivot wheel;
   receiving a first set of telemetry data points associated with a first set of positions of the compass, wherein the first set of telemetry data points is received while maintaining a fixed first pitch of the carriage and using the roll wheel to adjust the roll of the carriage to a first plurality of roll positions, wherein the fixed first pitch is maintained by locking the pivot wheel;
   adjusting the first pitch of the carriage to a second pitch by unlocking the pivot wheel, rotating the pivot wheel, and relocking the pivot wheel in response to the carriage being at the second pitch; and
   receiving a second set of telemetry data points associated with a second set of positions of the compass, wherein the second set of telemetry data points is received while maintaining the second pitch of the carriage fixed and using the roll wheel to adjust the roll of the carriage to a second plurality of roll positions.

5. The method of claim 4, further comprising comparing the first and second sets of telemetry data points to first and second expected telemetry field shapes to determine differences, wherein the first and second expected telemetry field shapes correspond, respectively, to the first and second sets of positions.

6. The method of claim 5, further comprising determining a set of calibration values based on the differences.

7. A system, comprising:
   a base assembly;
   a pivot assembly rotatably coupled to the base assembly and to a pivot wheel where the pivot wheel adjusts a pitch of a carriage, wherein the pivot wheel comprises a first fastening mechanism and the first fastening mechanism is configured to lock the pivot assembly in a particular first position;
   the carriage housing a compass and rotatably coupled to the pivot assembly and to a roll wheel where the roll wheel adjusts a roll of the carriage, wherein the roll wheel comprises a second fastening mechanism and the second fastening mechanism is configured to lock the carriage in a particular second position;

a non-transitory computer-readable medium in communication with a processor and storing instructions executable by the processor to:
  receive a set of telemetry calibration data points associated with a set of positions of the compass;
  compare the set of telemetry calibration data points to an expected telemetry field shape corresponding to the set of positions; and
  determine an accuracy value of the set of telemetry calibration data points in comparison to the expected telemetry field shape.

8. The system of claim 7, wherein:
the pivot assembly and the pivot wheel are configured to maintain a fixed pitch of the compass while adjusting a roll of the compass; and
the carriage and the roll wheel are configured to maintain a fixed roll of the compass while adjusting the pitch of the compass.

9. The system of claim 7, wherein the pivot assembly and the pivot wheel are configured to:
  maintain a first pitch of the compass while adjusting a roll of the compass;
  maintain a second pitch of the compass while adjusting the roll of the compass; and
  maintain a third pitch of the compass while adjusting the roll of the compass.

* * * * *